UNITED STATES PATENT OFFICE.

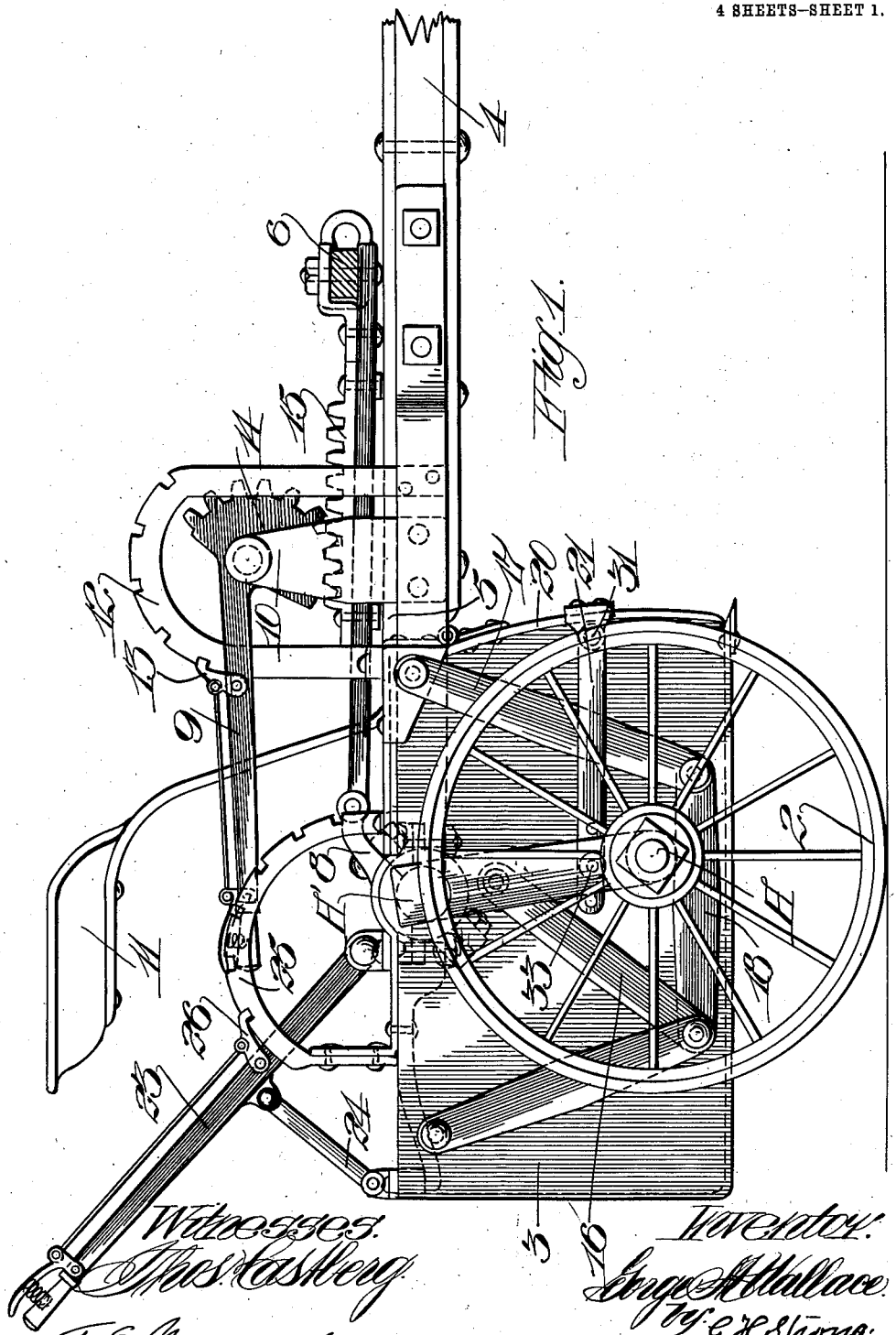

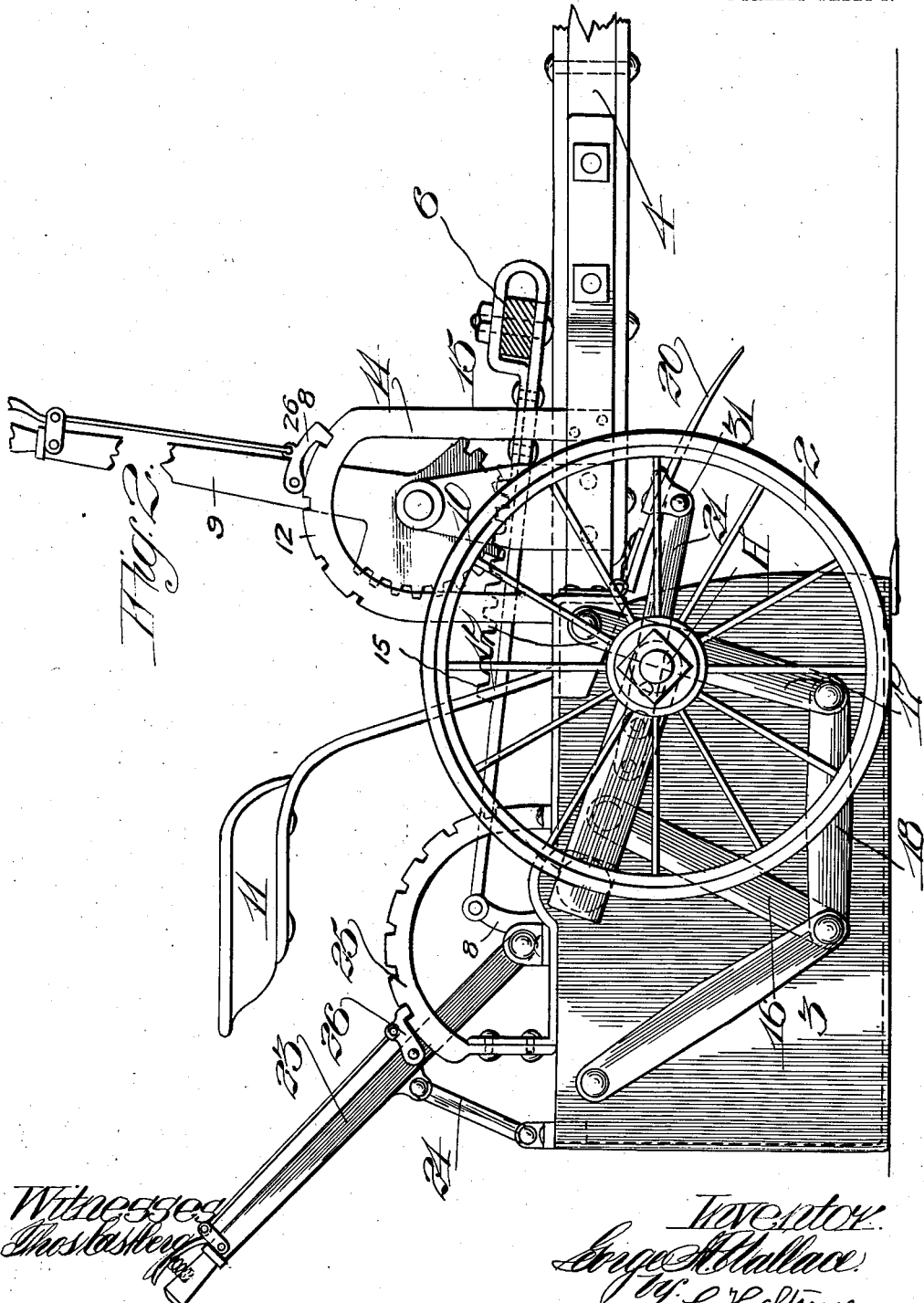

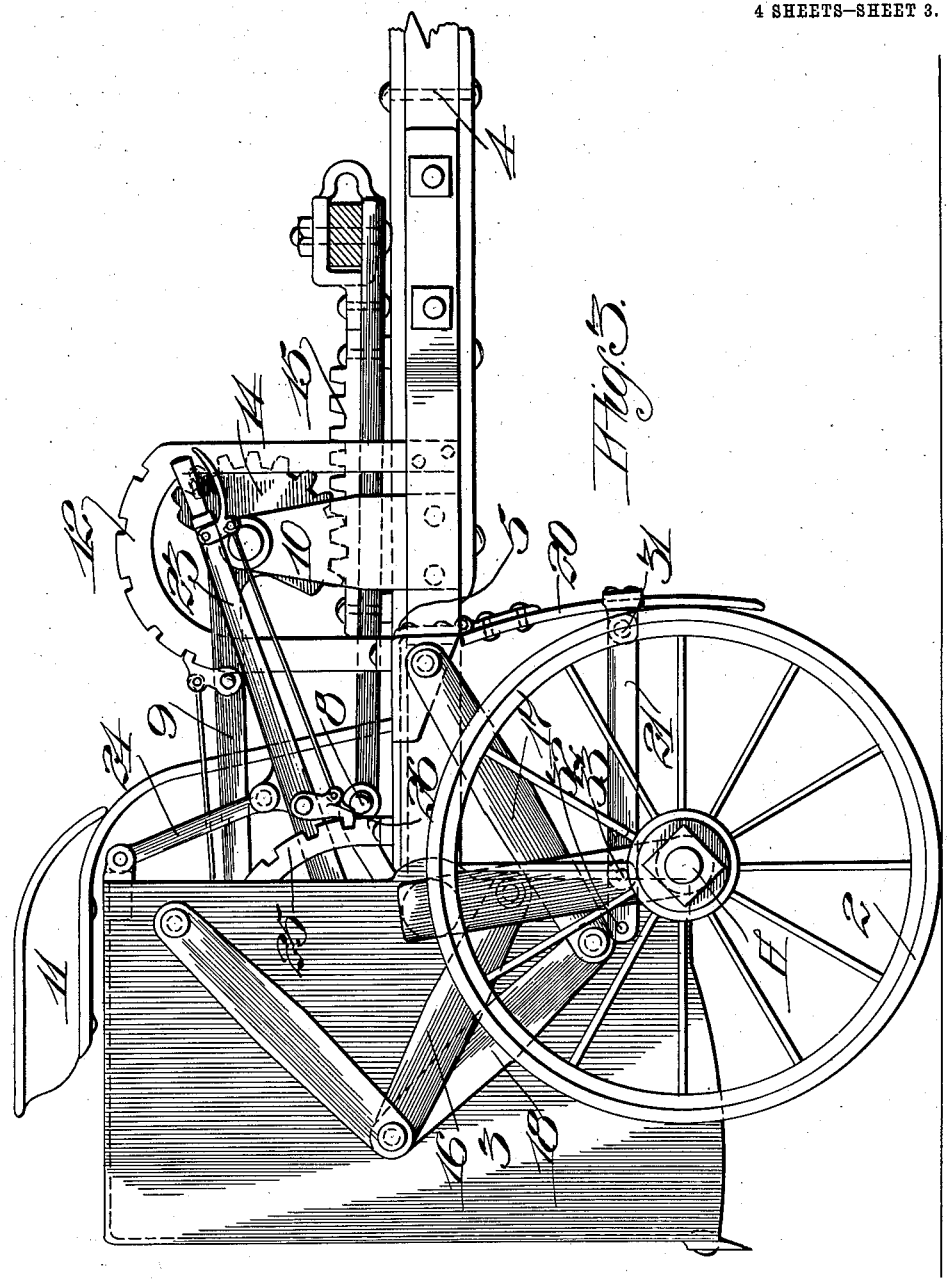

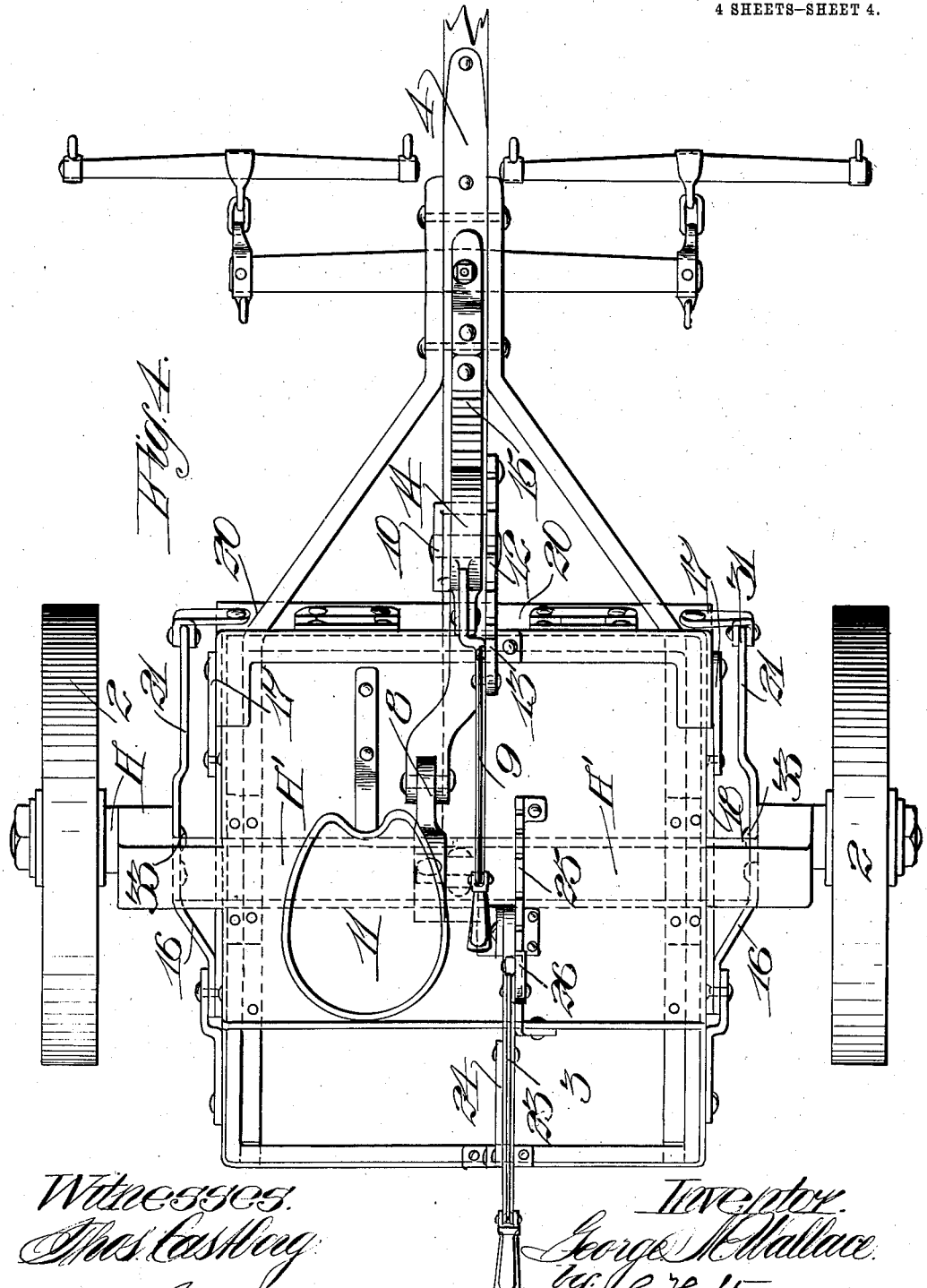

GEORGE M. WALLACE, OF YUBA CITY, CALIFORNIA.

WHEELED SCRAPER.

1,022,804.

Specification of Letters Patent.

Patented Apr. 9, 1912.

Application filed May 22, 1911. Serial No. 628,715.

*To all whom it may concern:*

Be it known that I, GEORGE M. WALLACE, citizen of the United States, residing at Yuba City, in the county of Sutter and State of California, have invented new and useful Improvements in Wheeled Scrapers, of which the following is a specification.

My invention relates to devices for scraping, excavating and moving earth.

It consists of a box or receptacle mounted upon the wheeled crank axle which is journaled and turnable with relation to the box, so that the latter may be depressed to load and raised when loaded, and in connection therewith is a rocker arm and bar fixed to the shaft and to which the team is connected so that the draft of the team may be employed to raise the loaded box and an associated rack and a lever actuated pinion serve to depress the box into working position. Connections are made with the crank axle and a front gate whereby the latter is opened simultaneously with the lowering of the box and closed when it is raised. Other connections between the box and the axle serve to maintain the box in a level position during the raising and lowering, and still other co-acting connections serve to tilt the box when it is desired to discharge the load.

My invention further consists in details of construction which will be more fully explained by reference to the accompanying drawings, in which—

Figure 1 shows the scraper in the loaded position. Fig. 2 in the scraping position. Fig. 3 in the dumping position. Fig. 4 is a plan view of the device.

As shown in the drawings A is an axle upon the ends of which are journaled bearing wheels 2. This axle is cranked upwardly to a considerable height so that the vertical arms of the crank serve as levers and have connections by which the operation of the parts is carried on. The horizontal portion A' of the axle extends through the upper part of the box or receptacle 3, the upper edge of which is provided with suitable bearings by which the box is journaled and suspended from the crank axle, which is made cylindrical at the bearing points so that the box itself may be tilted upon the axle when the latter is in a fixed substantially vertical position, and when the box is locked in its horizontal position the crank axle may be turned so as to raise or lower the box without changing that position.

4 is a pole which is fixed and suitably braced to the framework 5 in front upper portion of the box.

6 is a movable draft bar to the front of which the double trees and draft devices are connected for the attachment of the team by which the apparatus is to be hauled. The rear end of the draft bar is pivotally connected with a rocker arm 8 which is fixed firmly to the central portion of the crank shaft and its upper projecting end is connected with the rear of the draft bar 6, so that a pull upon this draft bar when free to move, will tend to raise the box or excavator from its lowest position to the highest. In conjunction with the draft bar and pole is a lever 9 pivotally mounted upon standards 10, which are fixed to the pole. The end of the lever extends rearwardly to a point contiguous to the driver's seat 11.

12 is a segmental rack also carried by the pole and the frame 5 and a slidable pawl movable in a guide 13 is engageable with the notches of the segmental holding rack when the box has been raised to its highest point and also when it is depressed to its lowest point. The lower end of the lever 9 carries a segmental pinion 14 and this is engageable with the upwardly projecting teeth 15 which are formed upon the draft bar 6.

The operation of this portion of the apparatus is as follows: When the lever 9 is pressed down to its lowest point the rotation of the pinion will act to move the toothed draft bar 6 forwardly, thus projecting the double trees 7 of the draft mechanism to their farthest forward extent. At the same time, the turning of the rocker arm 8 will have turned the crank shaft A to a substantially vertical position and as the pole 4 will be approximately horizontal, the excavator or carrying box 3 will have been lifted to its highest point from the ground, and in this position it is in condition to be transported either with or without a load, and it will be maintained in its level position by links 16 and 17; the former being pivoted at one end to the inside of the crank axle and at the other end connecting with the lower ends of one of the links 17. These links 17 have their upper ends pivoted one to the frame 5, and the other to the rear of the box 3, and the lower ends are connected by a link 18, so that they operate in unison to maintain the box in its position. When it is desired to lower the box the pawl 13 is disengaged from the segment 12 by a pawl operating lever contiguous to the handle of the lever 9. When thus disengaged the lever 9 being moved upwardly and forwardly will through the segmental pinion 14 on the rack 15 retract the draft bar 6 and allow the rocker arm 8 to turn backwardly, thus turning the crank shaft and allowing the box to sink to the surface of the ground. At the same time the double trees will be moved back in unison with the movement of the draft bar 6. The lever arm 9 will then be locked in this new position, so that any pull by the team will act to draw the whole apparatus forward upon its bearing wheels, and the lower edge of the excavating box being in the proper position will take up a load of earth as the machine is drawn along, until the box is sufficiently full. Then, in order to raise the box, the pawl of the lever 9 is disengaged from the segment 12 and the team moving forward will pull upon the draft bar 6. The weight and friction of the load in the box will tend to resist its forward movement and the result will be that the draft upon the bar 6 will act through the rocker arm 8 to revolve the crank shaft until it is in its approximately upright position and the load will have been lifted above the surface; the lever 9 being then latched in this position. As previously described, the further action of the team will tend to draw the machine along to any desired place of deposit. To the frame 5 at the upper part of the front of the box is hinged a gate 20. This gate is connected by links 21 to the crank axle A, at each end, so that the turning of the crank axle to lower or raise the box, acts to open or close the gate in unison with these movements.

When the apparatus has reached the point where it is desired to discharge the load, it is effected as follows:—23 is a lever, the lower end of which is suitably fulcrumed to a stationary part connected with the frame 5, and this lever is connected by a link 24 with the rear end of the box 3. 25 is a segmental rack and a reciprocating pawl guided as at 26 and having an actuating lever pivoted to the outer end of the lever 23, serves to engage the notches of the segment 25 and thus hold it in any desired position. When the lever is thrown back and the pawl engaged in this position the lever and the link 24 form a substantially rigid connection with the rear of the box and thus lock it with relation to the crank axle, which is locked as previously described by the lever mechanism 9, with the box in either its elevated or depressed position. When the box has been elevated as previously described, and it is desired to dump the load, the pawl of the lever 23 is disengaged and the lever moved forward, partly by the weight of the load and partly if needed, by manual force. This movement of the lever, the fulcrum of which is contiguous to the horizontal portion of the crank axle, tilts the box about the crank axle until it is in position to discharge its load and the box when in this position, or in some intermediate position, may be again locked and the bottom of the box then being in a more nearly vertical position will serve as a leveler when the apparatus is drawn over the land with the box in this position.

The apparatus thus constructed provides in one structure a scraper, a carrying receptacle which is filled by its own forward movement, a leveler with means for moving the various parts into the required position for each of the operations, and provides for the application of the power of the draft apparatus to produce the required movements.

The center of gravity of the load and box may be nicely adjusted, with the object of balancing the weight on the axle, by means of links 21 connected to each end of the gate 20 by pivots 31, the other ends of the links extending rearward and having a number of perforations 32 either of which may be adjusted over screws 33 in the cranks of the axle.

Having thus described my invention, what I claim and desire to secure by Letters Patent is—

1. A self-loading scraper and carrier, consisting of a wheeled crank axle, a box journaled and suspended upon said axle, a pole fixed to a rigid frame, a draft bar slidable with relation to the pole, a rocker arm connecting the rear of the draft bar with the crank axle, and means to lock the draft bar in position, said means including a pinion and a part carried thereby adapted to latch with the fixed part of the frame said draft bar having a toothed surface engaged by said pinion.

2. A self-loading scraper and carrier, consisting of a wheeled crank axle, a box journaled and suspended upon said axle, a pole fixed to a rigid frame, a toothed draft bar slidable with relation to the pole, a rocker arm connecting the rear of the draft bar with the crank axle, a fulcrumed lever, a toothed pinion carried thereby and engaging the teeth of the draft bar, a pawl carried by the lever and a segmental rack adapted to be engaged by the pawl whereby the crank axle may be turned to raise or lower the box.

3. A self loading scraper and carrier, consisting of a wheeled crank axle, a box journaled and suspended upon said axle, a pole fixed to the rigid frame, a draft-bar horizontally slidable with relation to the pole, and provided with teeth on its upper surface, a rocker arm connecting the rear of the draft bar with the crank axle, and means for operating the draft bar, said means including a fulcrumed lever, a toothed pinion carried thereby above the draft bar and engaging the toothed surface thereof, a pawl carried by the lever, and a segmental rack adapted to be engaged by the pawl whereby the crank axle may be turned to raise or lower the box.

4. In a loading and carrying apparatus, a wheeled crank axle, a load receiving and carrying box suspended therefrom a rigid pole, draft mechanism and connections therewith whereby the axle may be turned to raise or depress the box, said mechanism including a horizontal slidable draft bar having a toothed surface, and a manually operated pinion for moving the draft bar and holding means for holding the pinion to prevent movement of the draft bar.

5. In a loading and carrying apparatus, a wheeled crank axle, a load receiving and carrying box suspended therefrom having an independently hinged gate with link connections to the crank portions of the axle, means for raising and depressing the box, a lever pawl and rack mechanism and connections between the lever and the rear of the box whereby it is maintained in substantially horizontal position while being raised and lowered, said lever being movable to tilt the box and change the load when said box is in its elevated position.

In testimony whereof I have hereunto set my hand in the presence of two subscribing witnesses.

GEORGE M. WALLACE.

Witnesses:
F. M. HEWITT,
C. N. ALVORD.